US 9,223,803 B2

(12) United States Patent
Li

(10) Patent No.: US 9,223,803 B2
(45) Date of Patent: *Dec. 29, 2015

(54) CREATING AND ORGANIZING EVENTS IN AN ACTIVITY STREAM

(71) Applicant: Google Inc., Mountain View, CA (US)

(72) Inventor: Yang Li, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/261,803

(22) Filed: Apr. 25, 2014

(65) Prior Publication Data
US 2014/0337339 A1 Nov. 13, 2014

Related U.S. Application Data

(63) Continuation of application No. 13/304,812, filed on Nov. 28, 2011, now Pat. No. 8,745,057.

(51) Int. Cl.
G06F 17/30 (2006.01)
G06Q 10/10 (2012.01)
G06Q 50/00 (2012.01)

(52) U.S. Cl.
CPC .... *G06F 17/30247* (2013.01); *G06F 17/30047* (2013.01); *G06Q 10/109* (2013.01); *G06Q 50/01* (2013.01)

(58) Field of Classification Search
CPC .................. G06F 17/30247; G06F 17/30047
USPC .......................................................... 707/737
See application file for complete search history.

(56) References Cited

U.S. PATENT DOCUMENTS

| 7,305,392 | B1 | 12/2007 | Abrams et al. |
| 8,745,057 | B1* | 6/2014 | Li ................................ 707/737 |
| 2003/0061330 | A1 | 3/2003 | Frisco et al. |
| 2004/0261013 | A1 | 12/2004 | Wynn et al. |
| 2005/0197138 | A1* | 9/2005 | Kaminsky et al. .......... 455/456.1 |
| 2007/0005691 | A1* | 1/2007 | Pushparaj .................... 709/204 |
| 2011/0159890 | A1 | 6/2011 | Fortescue et al. |
| 2011/0196926 | A1 | 8/2011 | Crawford |
| 2012/0166432 | A1 | 6/2012 | Tseng |
| 2013/0031106 | A1 | 1/2013 | Schechter et al. |
| 2013/0097498 | A1* | 4/2013 | Steinberg et al. ............. 715/708 |

* cited by examiner

*Primary Examiner* — Jensen Hu
(74) *Attorney, Agent, or Firm* — Patent Law Works LLP

(57) ABSTRACT

A system and method for creating and organizing events includes an activity stream application that captures, searches and collaborates on one or more events. The events include unstructured data comprising text, digital ink, an audio clip and an image. The activity stream application receives user input and generates a new event and combines related events into the same activity. The activity stream application receives a search query and searches for events that are relevant to the search query. In one embodiment, the search query includes contextual information that includes at least one of at a similar time, at a similar location, in a similar situation and a relatedness of event attributes.

21 Claims, 17 Drawing Sheets

CREATING AND ORGANIZING EVENTS IN AN ACTIVITY STREAM

CROSS-REFERENCE TO RELATED APPLICATIONS

This application is a continuation of and claims priority to U.S. patent application Ser. No. 13/304,812, filed on Nov. 28, 2011, entitled "Creating and Organizing Events in an Activity Stream," which is incorporated by reference in its entirety.

BACKGROUND

The specification relates to creating and organizing events in an activity stream. In particular, the specification relates to capturing, searching and collaborating on one or more events where the data is unstructured, the data including images, ink and audio recordings.

There is an overabundance of information in the world. People try and keep track of information and tasks but memory is fallible.

People write down reminders on physical paper or save a text file to a computer. The text file can be accidently deleted and the paper can be thrown away, or the text file and paper can be forgotten. Another example is of a person taking a picture of a whiteboard to capture the discussion he had with a colleague. The picture can be hard to find if the user has taken many pictures on the same device.

In addition, collaboration between several people may be even more difficult. If a person wants to share a shopping list with her roommate they cannot both easily buy groceries without buying the same thing twice. Another example is of planning a trip. If two people are planning a trip together, it is difficult to collaborate on all aspects of the planning, especially if the two people are in different locations.

SUMMARY

In some examples, the specification describes a system and method for creating and organizing event data. In one embodiment, the specification describes identifying from a first activity stream a first event and first event attributes for the first event, identifying from a second activity stream a second event and second event attributes for the second event and associating the first event and the second event as being associated with a single activity based on a similar situation or a relatedness of the first and second event attributes.

In another embodiment, the system includes a processing module for identifying from a first activity stream a first event and first event attributes for the first event and identifying from a second activity stream a second event attributes for the second event and an activity stream module coupled to the processing module, the activity stream module for associating the first event and the second event as being associated with a single activity based on a similar situation or a relatedness of the first and second event attributes. Other aspects include corresponding systems, apparatus, including computer program products.

These and other embodiments can include one or more of the following features. For instance, a search query is received from a user, search parameters in the search query are identified, at least one matching event is identified and the at least one matching event is transmitted to the user. In another example, the search parameters include at least one of a time, a name of a collaborator, a description, an object involved with the event, a keyword, a longitude, a latitude and a location of the event. In yet another example, it is determined whether a user is authorized to view the at least one matching event based at least in part on whether the event is public, the event was shared with the user or the user is a collaborator. In some examples, the first and second events include foreground events and background events, the foreground event including information that a user interacts with and the background event including contextual information. In another example, the first activity stream and the second activity stream are different activity streams.

In one embodiment, the specification describes a method for receiving input from a user, identifying from the input an event and event attributes, generating an activity that includes the event, identifying data streams to determine that they include other events similar to the event based at least in part on the event attributes, updating the activity to include at least one of the other similar events and providing in the activity stream the updated activity.

In another embodiment, the system includes a processing module for receiving input from a user and identifying from the input an event and event attributes, an activity stream module coupled to the processing module, the activity stream module for identifying data streams to determine that they include other events similar to the event based at least in part on the event attributes and updating the activity to include at least one of the other similar event and a user interface coupled to the activity stream module, the user interface for providing in the activity stream the updated activity. Other aspects include corresponding systems, apparatus, including computer program products.

These and other embodiments can include one or more of the following features. For instance, the activity stream module identifies data streams by identifying an emergency from public activity streams. In another example, the input includes at least one of an image, ink, text and audio. In yet another example, the event attributes include at least one of a globally unique event identifier (ID), a creation time, a timestamp for the last visit, a user account ID, a list of the user account IDs for other users, an event ID preceding this event, an event ID followed by this event, a text note, an ink-based note, a picture or an audio-based note, a list of the user account IDs for other users, a textual description about the action of the subjects, a list of all objects involved, a latitude of the user when the event is created, a longitude of the user when the event is created and keywords.

These and other embodiments may provide one or more of the following advantages. The specification describes a way to efficiently capture event data by accepting input from digital ink, text, an image, a set of images, an audio recording or a video recording. In addition, the specification describes a way to search unstructured data. Lastly, the specification describes a system and method for associated different events with the same activity through collaboration with different users and searching other data streams.

BRIEF DESCRIPTION OF THE DRAWINGS

The specification is illustrated by way of example, and not by way of limitation in the figures of the accompanying drawings in which like reference numerals are used to refer to similar elements.

DETAILED DESCRIPTION

Creating and organizing event data is described below.

Figure 1:
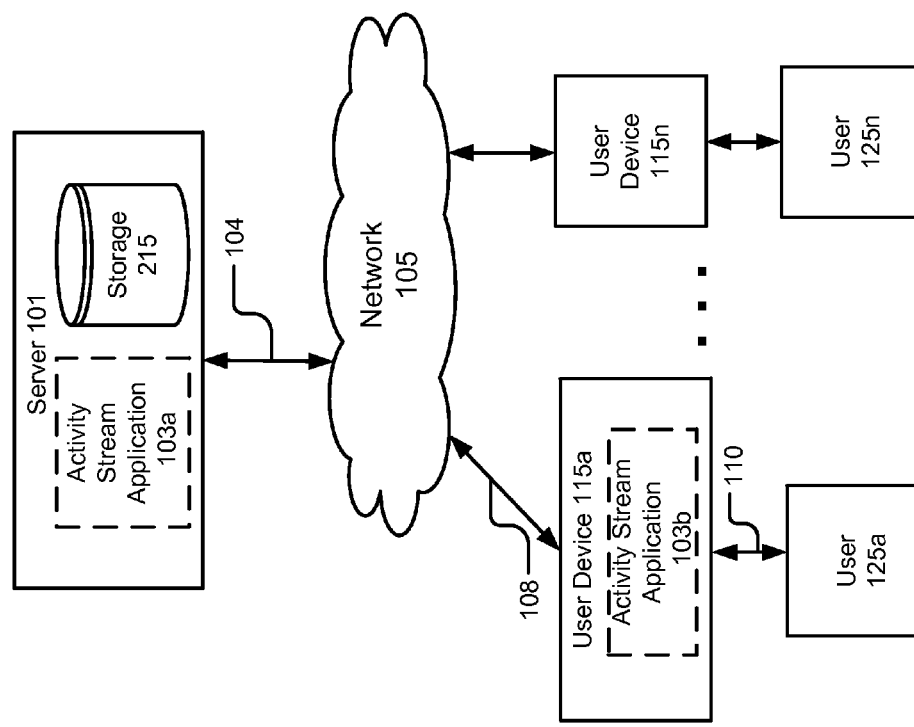
FIG. 1 is a block diagram illustrating one embodiment of a system for capturing, searching and collaborating on an event.

FIG. 1 illustrates a block diagram of a system 100 for creating and organizing event data according to some examples. The illustrated description of the system 100 includes user devices 115a . . . 115n that are accessed by users 125a . . . 125n and a server 101. In FIG. 1 and the remaining figures, a letter after a reference number, for example, "115a" is a reference to the element having that particular reference number. A reference number in the text without a following letter, for example, "115," is a general reference to any or all instances of the element bearing that reference number. In the illustrated embodiment, these entities are communicatively coupled via a network 105.

The user devices 115a . . . 115n in FIG. 1 are used by way of example. While FIG. 1 illustrates two user devices, the description applies to any system architecture having one or more user devices. Furthermore, while only one network 105 is coupled to the user devices 115a . . . 115n and the social network server 101, in practice any number of networks 105 can be connected to the entities.

In one embodiment, the activity stream application 103a is operable on the server 101, which is coupled to the network 105 via signal line 104 and also includes storage 215. The server 101 receives a request from a user device 115, the activity stream application 103a performs the requested task and retrieves user data from the storage 215 and transmits the requested data to the user device 115.

In another embodiment, the activity stream application 103b is stored on a user device 115a, which is connected to the network 105 via signal line 108. The user 125a interacts with the user device 115a via signal line 110. For example, the user device 115a . . . 115n is a personal computer ("PC"), a cell phone (e.g., a smart phone, a feature phone, a dumb phone, etc.), a tablet computer (or tablet PC), a laptop, etc. In one embodiment, the system 100 comprises a combination of different types of user devices 115a . . . 115n. In one embodiment, the user device 115 is a cell phone and the activity stream application 103b is a thin client that accesses data that is remotely stored in the storage 215 via the network 105. The activity stream application 103 are stored in any combination on the devices and servers.

The network 105 is a conventional type, wired or wireless, and may have any number of configurations include a star configuration, token ring configuration or other configurations known to those skilled in the art. Furthermore, the network 105 may comprise a local area network (LAN), a wide area network (WAN) (e.g., the Internet), and/or any other interconnected data path across which multiple devices may communicate. In yet another embodiment, the network 105 may be a peer-to-peer network. The network 105 may also be coupled to or includes portions of a telecommunications network for sending data in a variety of different communication protocols. In yet another embodiment, the network 105 includes Bluetooth communication networks or a cellular communications network for sending and receiving data including via short messaging service (SMS), multimedia messaging service (MMS), hypertext transfer protocol (HTTP), direct data connection, WAP, email, etc.

The activity stream application 103 can include code and routines for capturing, searching and collaborating on one or more events. The activity stream application 103 gives a user the ability to create and update events. In one embodiment, the activity stream application 103 receives and processes an event for the user and stores it for future access. In another embodiment, the activity stream application 103 receives and processes an event for a user and receives a follow up event from the user with updated information. In yet another embodiment, the activity stream application 103 receives input from the user to share the event with other users and receives input from other users to collaborate on the event. The activity stream application 103 is described in further detail below with reference to FIGS. 2-10.

An event can be an item defined by a user, e.g., the event is used to track the item for the user. For example, an event can be a task, a school or work related project, a shopping list, etc. The event can include the following properties: location, time, people that are involved in the event and the content of the event. Thus, in one embodiment, an event includes a time in which the event needs to be completed or when the event occurs. In another embodiment, an event includes a location in which the event takes place. In one embodiment, the event is related to one of a location specified by a uniform resource locator (URL), an internet protocol (IP) address, a tag, a check-in and the like. In another embodiment, an event is related to a physical location including latitude and longitude of a global positioning system (GPS). In yet another embodiment, the content of the event includes what has happened.

An activity is associated with one or more events. For example, an activity is insurance payment, which includes an event that is a task to pay your car insurance by a certain date and another event that is to send the payment to a certain location. An activity stream includes activities and events associated with a user.

The activity stream application 103 performs a set of actions in relation to the events that include follow ups and collaboration. A follow up is an action to form a task in an activity stream. For example, the user checks off items he has finished in a to-do list by performing a follow up. In addition, the user follows up on an event to update the status or progress of an activity. In one embodiment, the follow up action threads multiple events into a single activity. Collaboration involves the user collaborating with others on an activity by sharing at least one event with others.

Figure 2:
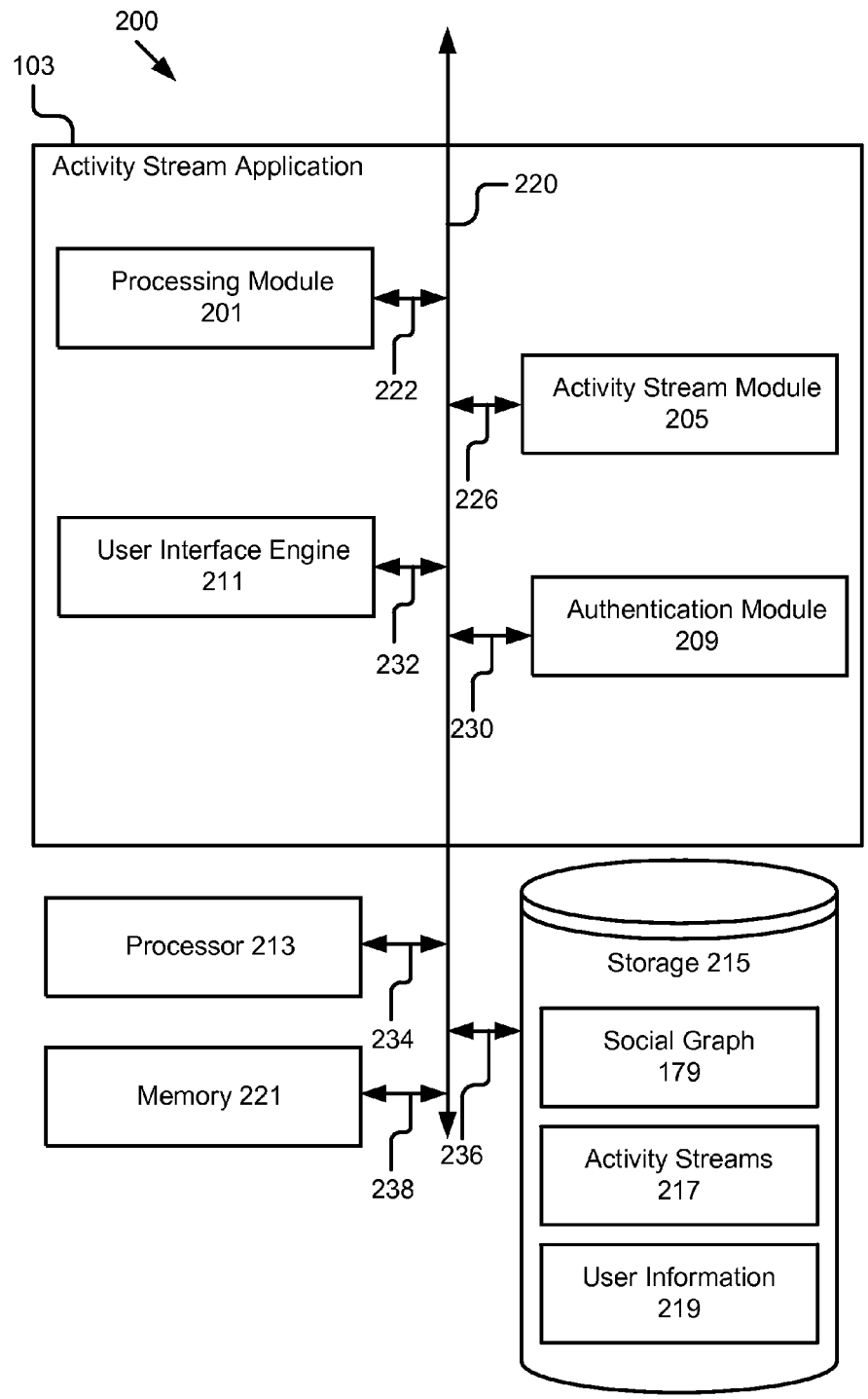
FIG. 2 is a block diagram illustrating one embodiment of an activity stream application.

Referring now to FIG. 2, the activity stream application 103 is shown in more detail. FIG. 2 is a block diagram of a computing device 200 that includes the activity stream application 103, a memory 221, storage 215 and a processor 213. In one embodiment, the computing device 200 is a server 101. In another embodiment, the computing device 200 is a user device 115a. Other system components are also possible, including a camera for capturing images, an audio recorder for capturing audio and a device for determining the user's location, including a global positioning system (GPS).

The processor 213 comprises an arithmetic logic unit, a microprocessor, a general purpose controller or some other processor array to perform computations and provide electronic display signals to a display device. The processor 213 is coupled to the bus 220 for communication with the other components via signal line 234. Processor 213 processes data signals and may comprise various computing architectures including a complex instruction set computer (CISC) architecture, a reduced instruction set computer (RISC) architecture, or an architecture implementing a combination of instruction sets. Although only a single processor is shown in FIG. 2, multiple processors may be included. The processing capability may be limited to supporting the display of images and the capture and transmission of images. The processing capability might be enough to perform more complex tasks, including various types of feature extraction and sampling. It will be obvious to one skilled in the art that other processors, operating systems, sensors, displays and physical configurations are possible.

The memory 221 stores instructions and/or data that may be executed by processor 213. The memory 221 is coupled to the bus 220 for communication with the other components via signal line 238. The instructions and/or data may comprise code for performing any and/or all of the techniques described herein. The memory 221 may be a dynamic random access memory (DRAM) device, a static random access memory (SRAM) device, flash memory or some other memory device known in the art. In one embodiment, the memory 221 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device known in the art for storing information on a more permanent basis.

The storage 215 is a non-transitory memory that stores data including a social graph 179, activity streams 217 and user information 219. The storage device 215 stores instructions and/or data that is executed by the processor 213. For example, the storage device 215 stores a social graph 179, activity streams 217 and user information 219. The storage device 215 is communicatively coupled by the bus 220 for communication with the other components of the computing device 200 via signal line 236.

In some implementations, the social graph 179 is a mapping of users that use the activity stream application and how they are related to each other. For example, in some social networks users are defined as being friends. In other social networks, one user follows another user. In yet another social network, a user creates a group of other users for sharing content.

The activity streams 217 are a list (or a database) of activities that include a sequence of events for one or more users. For example, an activity stream 217 includes the activity of planning a trip to Hawaii. The events for the activity are booking a flight and finding a hotel. In one embodiment, the activity streams 217 include one or more activities including all the events for a user so that when the activity stream module 205 retrieves the activity streams 217, it includes a history of events for the user.

The user information 219 is data describing the one or more users using the system 100. User information includes, for example, a user identification, password, gender, age, education, past and present employers, geographic location, family members, friends, etc.

The activity stream application 103 comprises a processing module 201, an activity stream module 205, an authentication module 209 and a user interface engine 211.

The processing module 201 is software including routines for receiving and handling input. In one embodiment, the processing module 201 is a set of instructions executable by the processor 213 to provide the functionality described below for receiving, handling and processing one or more requests and receiving input and identifying events and event attributes in the user input. In another embodiment, the processing module 201 is stored in the memory 221 of the computing device 200 and is accessible and executable by the processor 213. In either embodiment, the processing module 201 is adapted for cooperation and communication with the processor 213 and other components of the computing device 200 via signal line 222.

The processing module 201 receives input by a user 125 from a user device 115. In one embodiment, input for the event is manually provided by a user 125. For example, the user 125 presses a button on a user interface displayed on the user device 115. In another embodiment, the processing module 201 receives the input from other sources, including a GPS device or from the server 101.

The user device 115 transmits the input to the processing module 201. For example, if the activity stream application 103 is stored on the user device 115, the user interface engine 211 transmits the input to the processing module 201. If the activity stream application 103 is stored on the server 101, the user device 115 transmits the input to the server 101 via a communication device (not shown).

The processing module 201 identifies an event, determines whether the event is a foreground event or a background event and identifies or assigns attributes to the event. Foreground events are what a user explicitly creates and interacts with, for example, a whiteboard picture or a reminder for dinner. Background events are implicit and capture the contextual information that might be related to a foreground event, for example, locations or an incoming call.

Once the processing module 201 identifies whether the event is a foreground or background event, the processing module 201 assigns a unique identifier (ID) to the event and identifies other attributes associated with the event. In one embodiment, the foreground event includes at least one of the following event attributes: a globally unique event ID, a creation time, a timestamp for the last visit, a user account ID (i.e. the creator), a list of the user account IDs for other users (i.e. the collaborators), an event ID preceding this event, an event ID followed by this event, a text note, an ink-based note, a picture or an audio-based note. In another embodiment, a background event includes at least one of the following attributes: a globally unique event ID, a time when the event is generated, a list of the user account IDs for other users (i.e. the subject), a textual description about the action of the subjects (i.e. an action), a list of all objects involved, the latitude of the user when the event is created, the longitude of the user when the event is created and a textual description or keywords (e.g. about the place where the event is created). The processing module 201 identifies the latitude and longitude of the user at the time that the event occurred and, based on the latitude and longitude, identifies the place associated with the event. The processing module 201 adds the place as a keyword.

The processing module 201 sends the events and event attributes to the activity stream module 205. In one embodiment, the processing module 201 transmits the events and event attributes to storage 215 for indexing and storage.

The activity stream module 205 is software including routines for creating and managing activity streams. In one embodiment, the activity stream module 205 is a set of instructions executable by the processor 213 to provide functionality described below for creating activity streams and responding to a query for a subset of the activity stream. In another embodiment, the activity stream module 205 is stored in the memory 221 of the computing device 200 and is accessible and executable by the processor 213. In either embodiment, the activity stream module 205 is adapted for cooperation and communication with the processor 213 and other components of the computing device 200 via signal line 226.

The activity stream module 205 receives events and event attributes from the processing module 201 or storage 215. The activity stream module 205 analyzes the events and event attributes to identify an associated activity and generates an activity stream 217 by combining the events into an activity. For example, if two users each created a different event for the same project (e.g. a first user created a task for completing a design document for the project and the second user created an event of the prototype being due on a certain day) and at least one of the events includes the ID for both users, the activity stream module 205 combines the events into the same activity. The activity stream module 205 sends the activity streams 217 to the user interface engine 211, which generates.

The authentication module 209 is software including routines for registering a user and managing the privacy of events according to specified permissions. In one embodiment, the authentication module 209 is a set of instructions executable by the processor 213 to provide the functionality described below for registering user information 219 and checking permissions before publishing one or more events. In another embodiment, the authentication module 209 is stored in the memory 221 of the computing device 200 and is accessible and executable by the processor 213. In either embodiment, the authentication module 209 is adapted for cooperation and communication with the processor 213 and other components of the computing device 200 via signal line 230.

In one embodiment, the authentication module 209 receives registration information from a user, including the user's name, username, password and demographic information (age, location, gender, work history, etc.). The authentication module 209 generates user information 219, including a unique identifier for the user and stores the anonymized user information 219 in storage 215.

In another embodiment, the authentication module 209 receives a request for an activity stream 217 from a requesting user via the processing module 201. The authentication module 209 confirms that the requesting user has permission to view the results, i.e. the requesting user ID matches one of the collaborator user IDs. If there is no match the authentication module 209 refuses to transmit the request to the activity stream module 205. If there is a match, the authentication module 209 transmits the request to the activity stream module 205.

The user interface engine 211 is software including routines for generating graphical data for displaying a user interface on a user device 115 that includes the activity streams 217. In one embodiment, the user interface engine 211 is a set of instructions executable by the processor 213 to provide the functionality described below for generating graphical data for displaying the user interface. In another embodiment, the user interface engine 211 is stored in the memory 221 of the computing device 200 and is accessible and executable by the processor 213. In either embodiment, the user interface engine 211 is adapted for cooperation and communication with the processor 213 and other components of the computing device 200 via signal line 232.

The user interface engine 211 receives one or more of the activity streams 217, the user information 219 from the activity stream module 205, the authentication module 209 or storage 215 and generates graphical data for providing a user interface to present and interact with the activity streams 217. In one embodiment, the user interface includes basic attributes, including whether an event is shared (i.e. permission information), when the event was created and a description of the event. The description includes text, ink, audio and picture information. The user interface engine 211 sends the graphical data to the user device 115a . . . 115n via a communication unit (not shown) for display in a browser or other display device.

In one embodiment, the user interface engine 211 displays an image included in the event. In another embodiment, the user interface engine 211 includes a link to an audio recording that the user listens to. In yet another embodiment, the user interface 211 includes a text or ink-based note that the user reads.

In addition to the user interface engine 211 including events created by the user, in one embodiment the user interface engine 211 includes an option for the user to subscribe to other activity streams 217. The activity stream module 205 retrieves activity streams 217 that are public in response to a user request. In addition, once another user shares an activity with the user, the user interface engine 211 sends the user a request as to whether the user wants the activity to be included in the user's activity stream 217.

Figure 3:
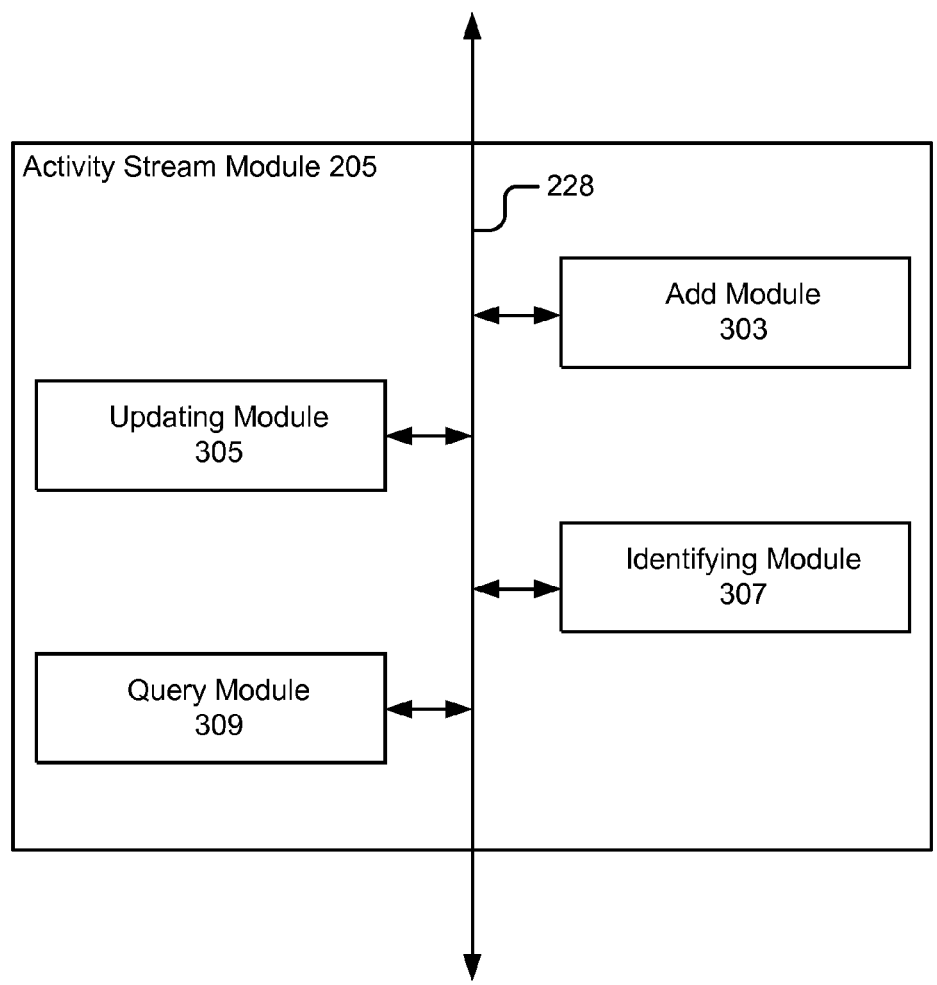
FIG. 3 is a block diagram of one embodiment of a thread engine.

Turning now to the activity stream module 205, FIG. 3 illustrates a block diagram of a more detailed description of the activity stream module 205 according to some examples. The illustrated description of the activity stream module 205 includes an add module 303, an updating module 305, an identifying module 307 and a query module 309. In the illustrated embodiment, these entities are communicatively coupled via a bus 228.

The add module 303 receives events and event attributes from the processing module 201 and generates an activity that includes the events that correspond to the same activity and organizes the event attributes. The add module 303 recognizes both foreground and background events as being associated with the activity. The activities are combined into an activity stream 217 that is transmitted to the user interface engine 211 for generating graphical data for displaying the activity stream 217 in a user interface on the user device 115.

In one embodiment, the add module 303 generates an event or an activity (which combines multiple related events) in response to a request from the user. For example, the user captures event information and presses a button on the user interface to add the event information. In one embodiment, the event information is digital ink, text, an image, a set of images, an audio recording or a video recording. For example, the image is a digital image taken from a camera connected to the user device 115, a picture that already exists in the storage device 215, or a picture received from another source. In another embodiment, the event information is audio file. In yet another embodiment, the event information is a text or ink based note. In one embodiment, the user adds the event or an activity through an HTTP request that was generated by the user interface engine 211. The attributes of the event (as described with reference to the processing module 201) are packaged and delivered in the body of an HTTP request.

The updating module 305 updates an activity in the activity stream 217. For example, a user selects a follow-up button on the user interface for an event. The updating module 305 receives the request from the user interface engine 211 and generates a new event in the form of a task in the activity stream 217. The user selects the follow-up button to update the status or the progress of an activity. For example, if a user selects the follow-up button for the event of paying the car insurance, the updating module 305 generates a task event for updating the status of paying the car insurance and transmits the task to the user interface engine 211. The user interface engine 211 displays the task event and the user updates the task event by marking the task event as complete for writing the check and adding a new task event for purchasing stamps.

The updating module 305 also updates attributes of the activity streams 217. For example, the add module 303 generates an event with a default privacy setting. In response, the user selects a button on the user interface for sharing the event with a specific user or publishing the event, which shares the event with all users. If the event is part of an activity, the user interface engine 211 generates a notification for the user asking if the user wants to share all events associated with the activity. In one embodiment, the updated information contains a picture, audio recording, text or ink based notes, etc. In another embodiment, the updating module 305 receives events from other users for collaboration. For example, a school project has a group of people working together on the same project. Users create an event for their school project and each user submits follow-up events with new information. This gives the users the ability to collaborate easily on a single project.

The identifying module 307 identifies data in the user's other data streams to correlate the activity streams 217 with other information. For example, if the user creates a calendar item for September 30$^{th}$ for the 5 k marathon, the identifying module 307 identifies the calendar item and incorporates it into the activity stream 217 for preparing for the marathon. In one embodiment, the identifying module 307 identifies the user's record of phone calls and subsequent activities. For example, if the user always makes an appointment after receiving a phone call from the dentist, the identifying module 307 correlates the phone number with an event for the user to visit the dentist. In yet another embodiment, the identifying module 307 identifies public activity streams 217 that include information. For example, if an emergency occurs including an earthquake and multiple users include the same term (i.e. "earthquake"), the identifying module 307 adds the event to the user's activity stream.

In one embodiment, the identifying module 307 transmits instructions to the user interface module 211 to generate a notification for the user, asking permission to incorporate the calendar item into the activity stream 217 in case the activity stream 217 and the calendar item are unrelated. In one embodiment, the identifying module 307 identifies the user's calendar, email, search terms and browsing history for items to incorporate into the activity stream 217.

In one embodiment, the user activates a search request by selecting a button in the user interface. The query module 309 receives the search request from the authentication module 209 after the authentication module confirms that the requesting user has authorization to receive the data. The query module 309 queries the activity stream 217 for events and activities that match the request. In one embodiment, the request is an HTTP request similar to the following example: https://activitystream.plex.com/events?st=24235235&et=6766686&search=coll:Justin. In this example, the time period is specified by "st," which represents a starting time and "et," which represents the ending time. The time includes when the event takes place or when the event was added. The query is also limited to all events that involve "Justin."

Other types of searching parameters are possible. In one embodiment, the search query includes a keyword. The keyword is a word that appears in one of the attributes for the event. For example, a work project about designing a new car has keywords including: engine, tire, automobile, car, windshield, etc. In another embodiment, the query module 309 searches via a location where the event takes place or where the event was added. In another embodiment, the search query includes a list of collaborators.

In yet another embodiment, the query module 309 uses an image captured by the user as a query to search all of the published activity stream events. For example, a user attends a talk given by a professor that uses a power-point slideshow. The user captures a picture of one of the slides. The professor publishes his slideshow to the public. By using the captured image as a query, the user finds the professor's slideshow and can share them with other people. In another example, the query module 309 submits contextual information including the time and location that the image was captured to further aid in identifying matching events.

Once the query module 309 retrieves the events that match the query, the query module 309 transmits the matching events to the user interface engine 211. The user interface engine 211 generates graphical data for displaying the search results with the matching events displayed as expanded events and events that did not match the search query being collapsed. In any case, the user interface engine 211 maintains the temporal order of the events based on their creation time and instead of taking out irrelevant events, the user interface engine 211 collapses the events.

Figure 4A:
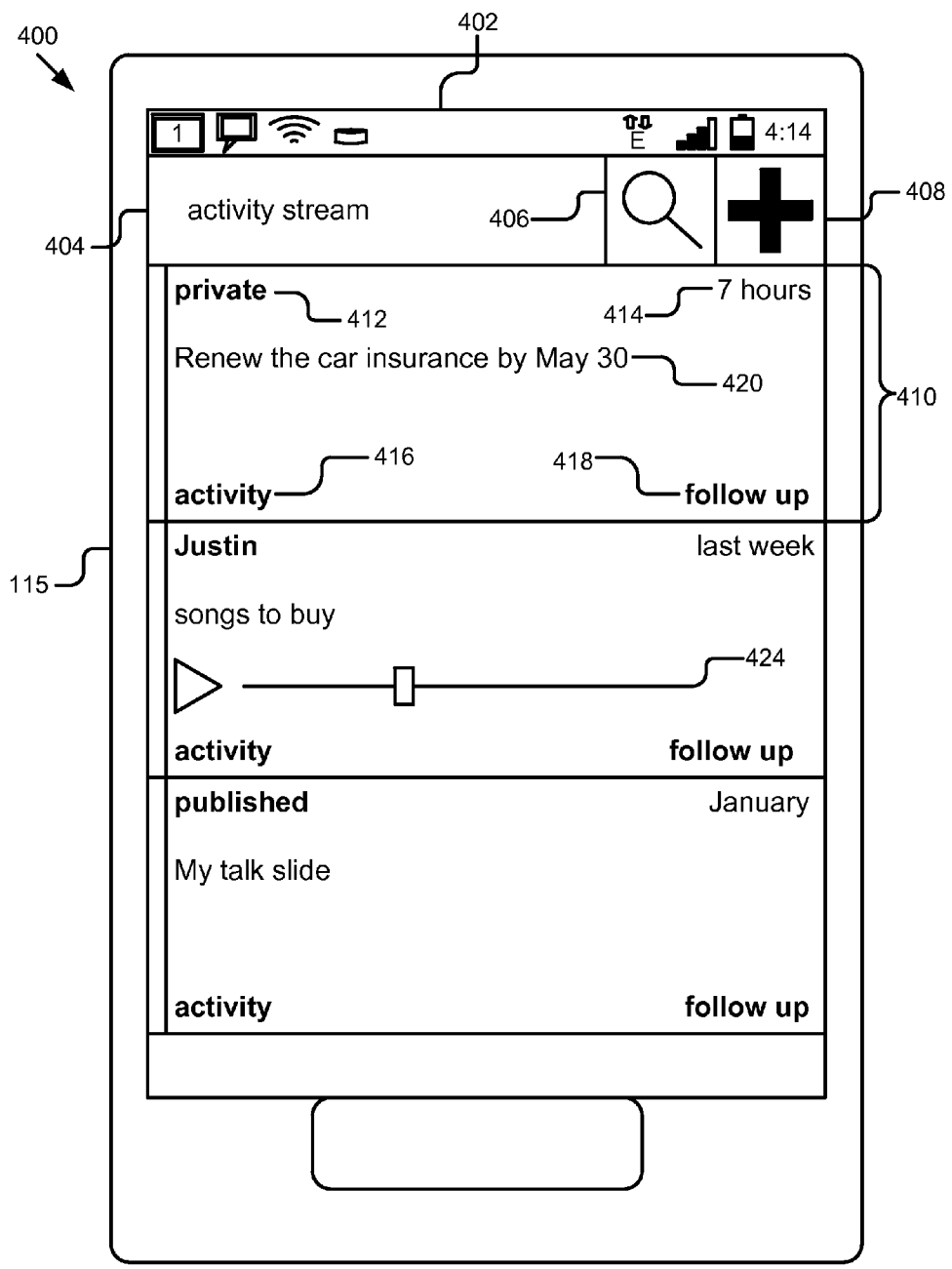
FIG. 4A is one example of a graphic representation of a user interface that is generated by a user interface engine for viewing a list of events.

Turning now to FIG. 4A, a graphic representation 400 of a user device 115 that includes a user interface is displayed. The user interface engine 211 generates the user interface for presenting the activity streams 217 to the user. In this example, user device 115 is represented as a smart phone, although one skilled in the art will recognize that other computing devices may be used, including a tablet, a laptop and a personal computer.

In this example, a notification bar 402 displays notifications related to the user including but not limited to: calendar events, SMS/MMS messages, WiFi connection, system updates, signal strength, signal speed, battery charge and time. The activity stream toolbar 404 contains a search button 406 and an add button 408.

FIG. 4A also includes an event box 410 that contains: a permission notification 412, a date stamp 414, an activity button 416, a follow up link 418 and a textual event description 420. The permission notification 412 displays the current permissions settings. For example, the permission notification 412 displays: private, if the user wants to keep the event private; published, if the user has shared the event with a group of users; or it displays another user's name to show that that user is involved with the event. Other examples of permissions are possible, including published to a specific group of users.

In one embodiment, the date stamp 414 includes the time and date of when the event, or follow up to the event was created. In another embodiment, the date stamp 414 displays a time relative to the current time. For example; 7 hours ago, yesterday, last week, last month, last year, etc.

In response to a user selecting the activity button 416, the user interface generates a display of all events that are related to the activity. In one embodiment, the activity button 416 is called a thread.

Responsive to a user selecting the follow up link 418, the user interface engine 211 transmits a notification to the updating module 305 that the user wants to follow up the selected event. In one embodiment, when the user selects the follow up link 418 the user interface engine 211 displays a new event and the updating module 305 adds the new event to the selected activity.

The event description is any type of unstructured data. For example, the event description is a picture, an audio recording, text or ink based notes, etc. In one embodiment, the event description is a picture of an art project in progress. In another embodiment, the event description is an audio recording reminding the user to buy milk. In yet another embodiment, the event description is a text reminder telling the user when to pay the car insurance.

In another embodiment, the event description is an audio clip 424 that plays the audio file on the device. For example, the user records a song that she would like to buy and captures it as an event. The user plays the song to remember which song she wants to buy.

In one embodiment the user interface includes a color highlight (not shown) for additional categorization of the events. In one embodiment, the color highlight is used to distinguish between the different permissions of an event. For example, the color red indicates that the event is private, yellow is to indicate that the event is by a different user, and green is to indicate that the event is open to everyone. In another embodiment, the color highlight indicates the type of event. For example, different colors are used for work, school, personal, group events, etc. In one embodiment, the user manually defines colors for each type of event. In another embodiment, the color highlight denotes whether events on the screen belong to the same thread. For example, if both events have a green color, they belong to the same thread (generated by "follow up").

Figure 4B:
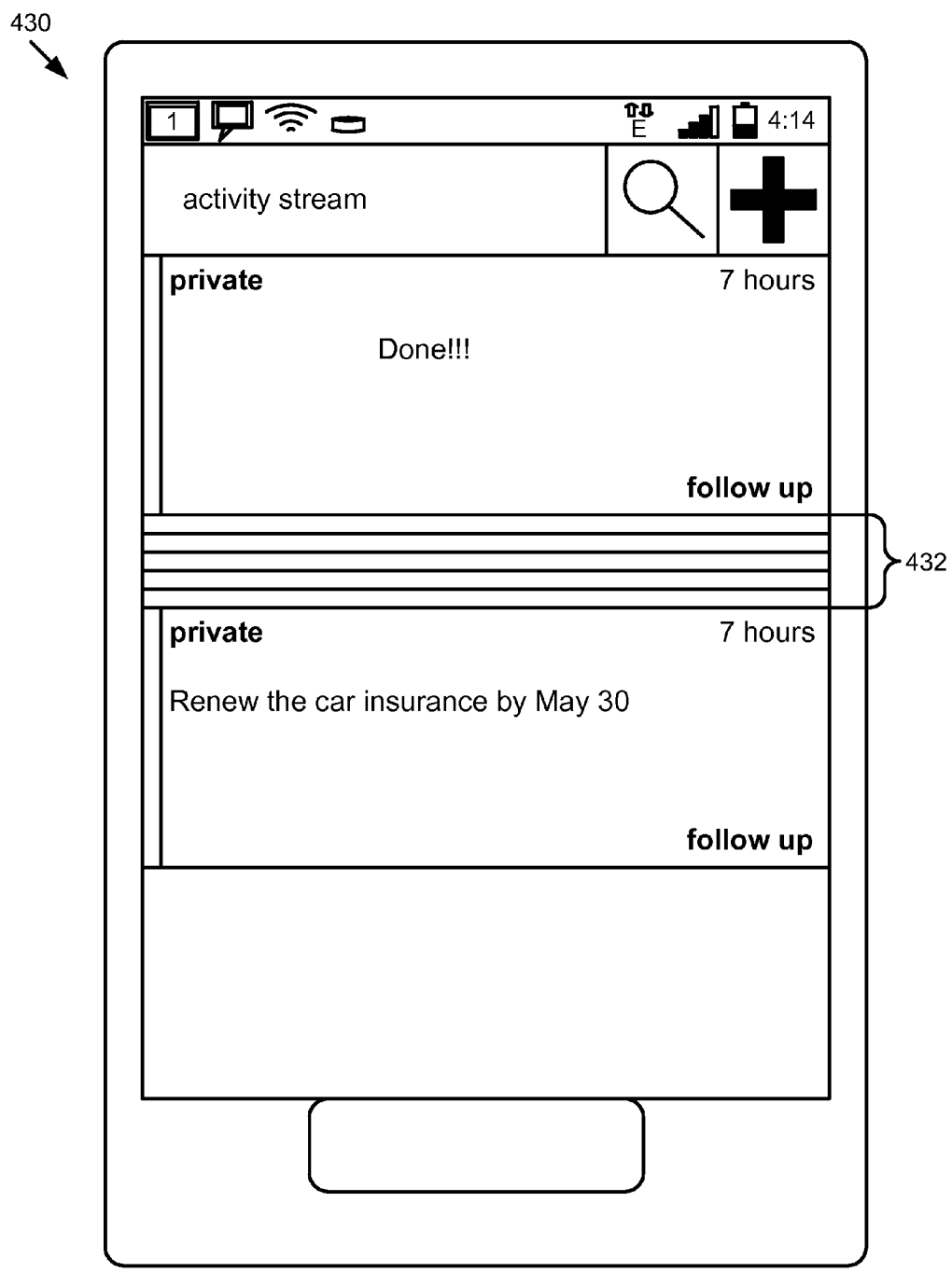
FIG. 4B is one example of a graphic representation of a user interface that is generated by a user interface engine for collapsing a list of events.

Turning now to FIG. 4B, a graphic representation 430 of search results are illustrated. In this example, the user submitted a query for the events related to the activity of paying the car insurance. In another embodiment, the user selected the activity button for one of the events. The user interface engine 211 displays the search query results for the related events and collapses the events that are not related 432.

Figure 4C:
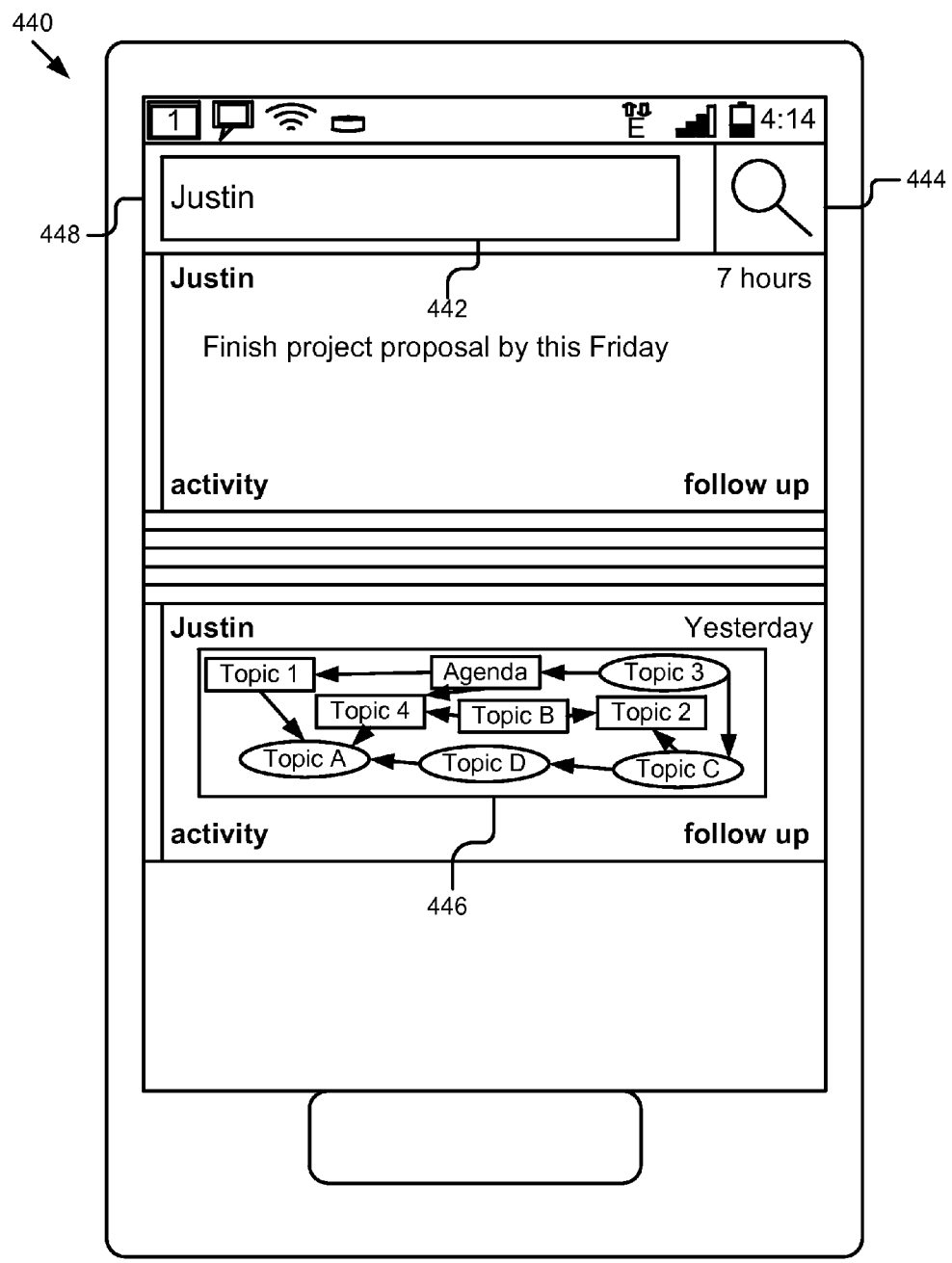
FIG. 4C is one example of a graphic representation of a user interface that is generated by a user interface engine for collapsing a list of events based on the relevance of events.

Turning now to FIG. 4C, a representation 440 of the search results for events involving Justin are illustrated. In this example, when the search button 444 is pressed, the user interface engine 211 generates a search box 442 that is displayed in the toolbar 448 and receives a search query from the user. In this example, when the name Justin is entered into the search box 452, only the events that involve Justin are displayed. In one embodiment, one of the events contains an image 446 that was added by Justin.

Figure 4D:
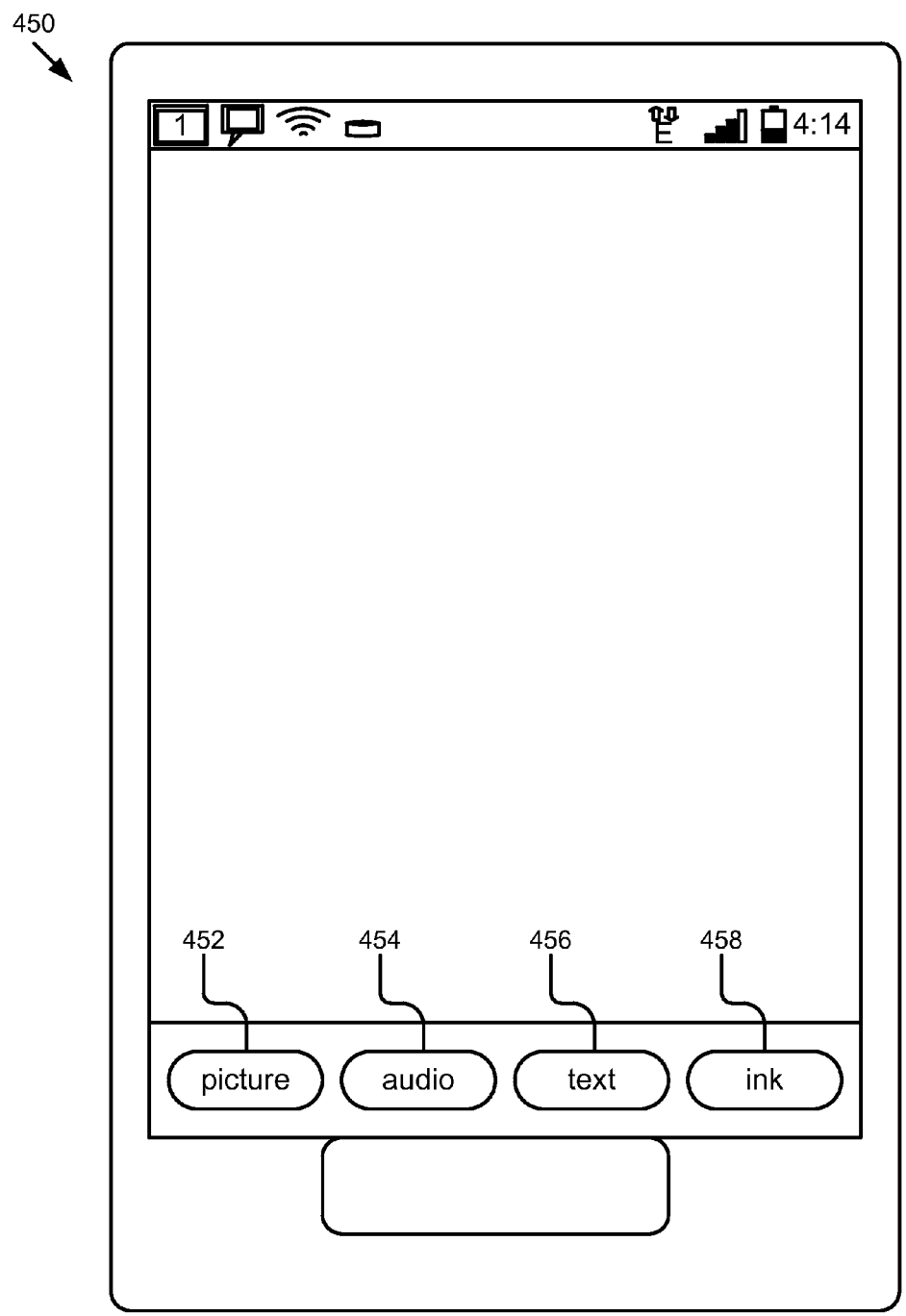
FIG. 4D is one example of a graphic representation of a user interface that is generated by a user interface engine for capturing different types of events.

Turning now to FIG. 4D, a representation 450 of the different data sources that are processed by the processing module 201 is illustrated. In this example, the user interface engine 211 receives a selection of a picture button 452, an audio button 454, a text button 456, or an ink button 458. Although only four examples of different data types are used in FIG. 4D, any number of data source buttons can be used.

In one embodiment, the different buttons are toggle buttons and selecting a specific button causes the user interface engine 211 to display a selected layer. In a specific layer, the layer-related menu appears at the top of the screen (or elsewhere on the screen). For example, selecting the ink button 458 causes the user interface engine 211 to display undo and erase buttons. Selecting the picture button 452 causes the user interface engine 211 to display a camera application for taking pictures. Selecting the audio button 454 causes the user interface engine 211 to activate an audio recorder. Selecting the text button 456 causes the user interface engine 211 to display a soft keypad for entering text.

Figure 4E:
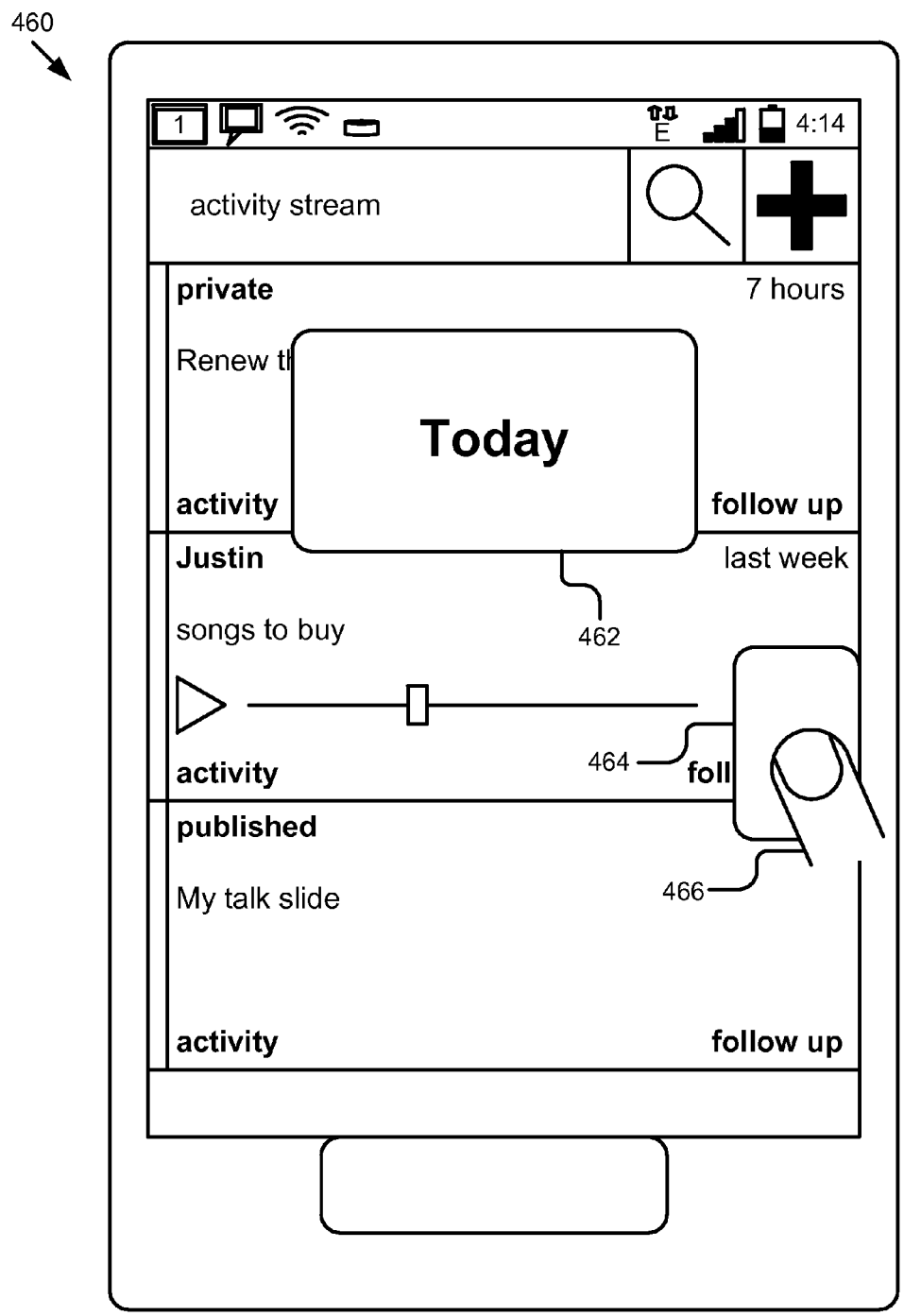
FIG. 4E is one example of a graphic representation of a user interface that is generated by a user interface engine for quickly scrolling a list of events.

Turning now to FIG. 4E, a representation 460 of events organized by a date is illustrated. In one embodiment, responsive to a the user pressing his finger 466 on the right side of the touch screen the user interface engine 211 generates a scroll bar 464 and notification 462. The user slides his finger up and down the side of the screen to quickly sort through the events based upon the date according to one embodiment. Although the notification 462 displays a time, other types of categorization options are possible.

Figure 4F:
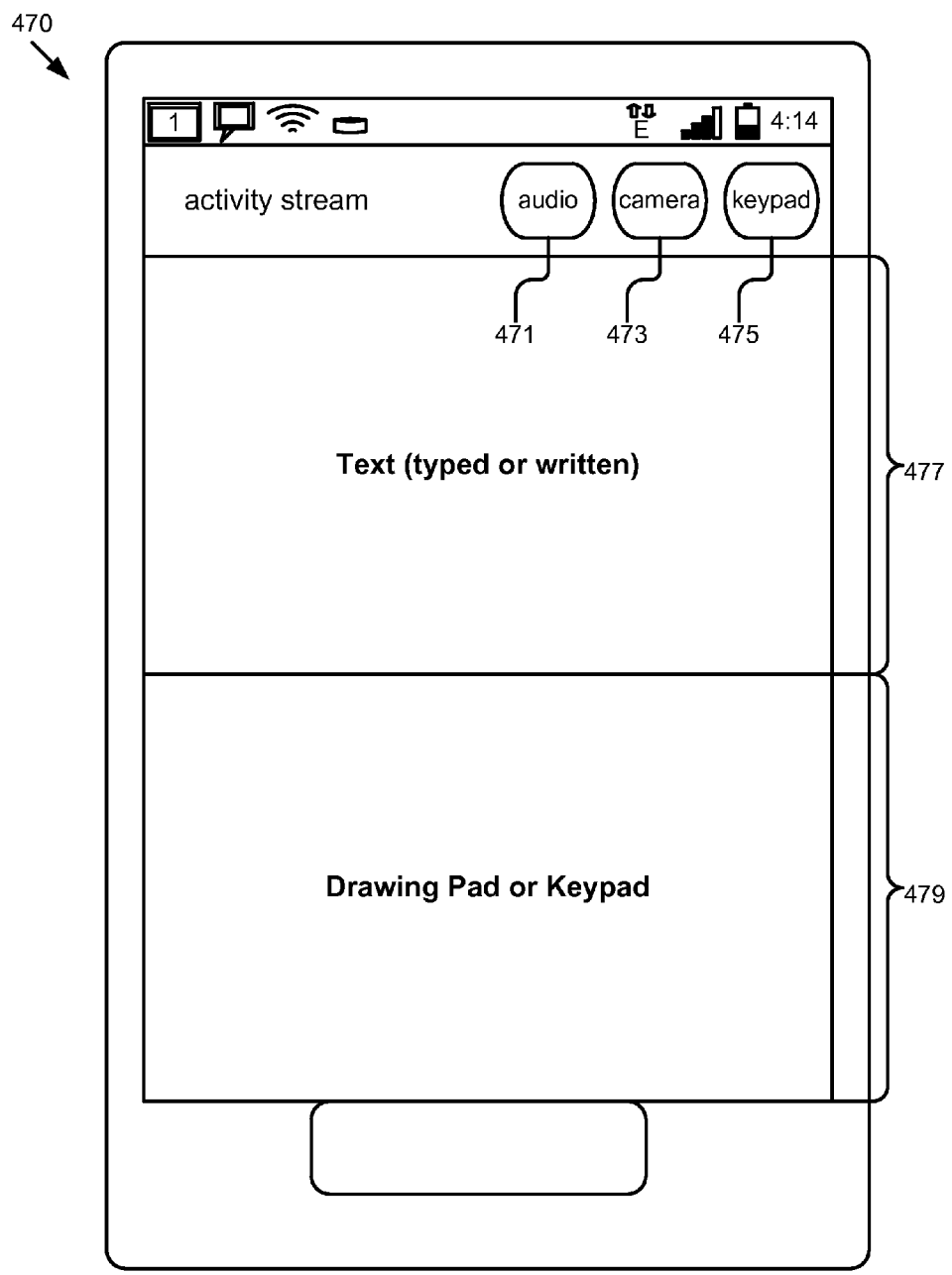
FIG. 4F is one example of a graphic representation of a user interface that is generated by a user interface engine for displaying a default text mode.

Turning now to FIG. 4F, a representation 470 of the text mode is illustrated. In one embodiment, the user interface displays an audio button 471, a camera button 473, a keypad button 475, a text area 477, and a drawing pad or keypad 479. In one embodiment, the audio button 471 captures audio, the camera button 473 captures a picture, and the keypad button 475 captures text. Although only three buttons are displayed in FIG. 4F, any number of buttons can be displayed. The text area 477 contains text that is either typed or written. The drawing or key pad 479 receives text or drawings from the user.

Figure 4G:
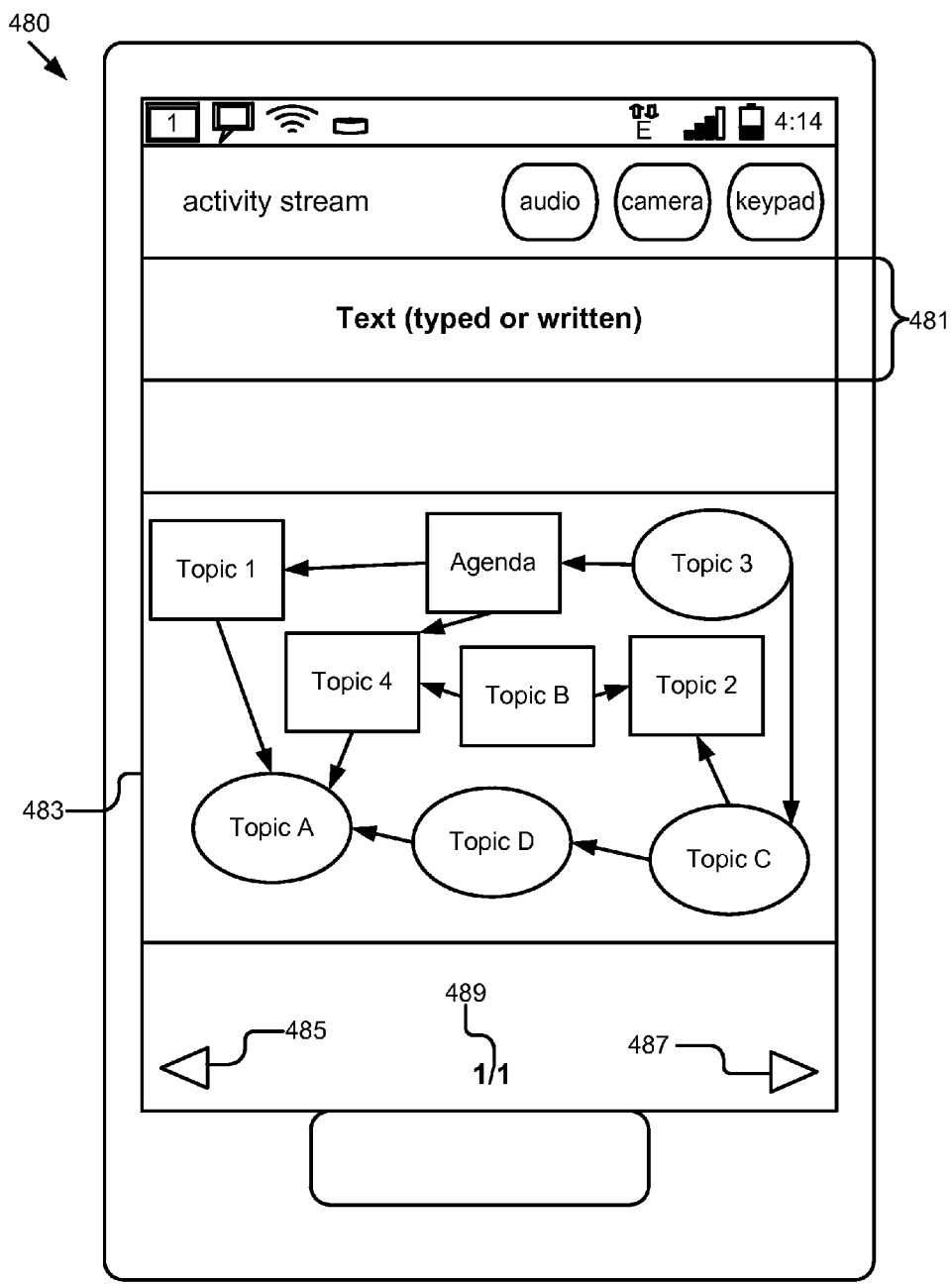
FIG. 4G is one example of a graphic representation of a user interface that is generated by a user interface engine for displaying picture mode.

Turning now to FIG. 4G, a representation 480 of the picture mode is illustrated. In one embodiment, the user interface displays a text area 481, a picture 483, a back button 485, a forward button 487, and a picture number 489. The text area 481 captures text from the user. The picture 483 is the current picture being displayed. The back button 485 displays the previous picture in the list of pictures. The forward button 487 displays the next picture in the list of pictures. The picture number 489 displays the number of the current picture. In one embodiment, the picture number 489 also displays the number of pictures that are in the list (i.e. 1/1).

Figure 4H:
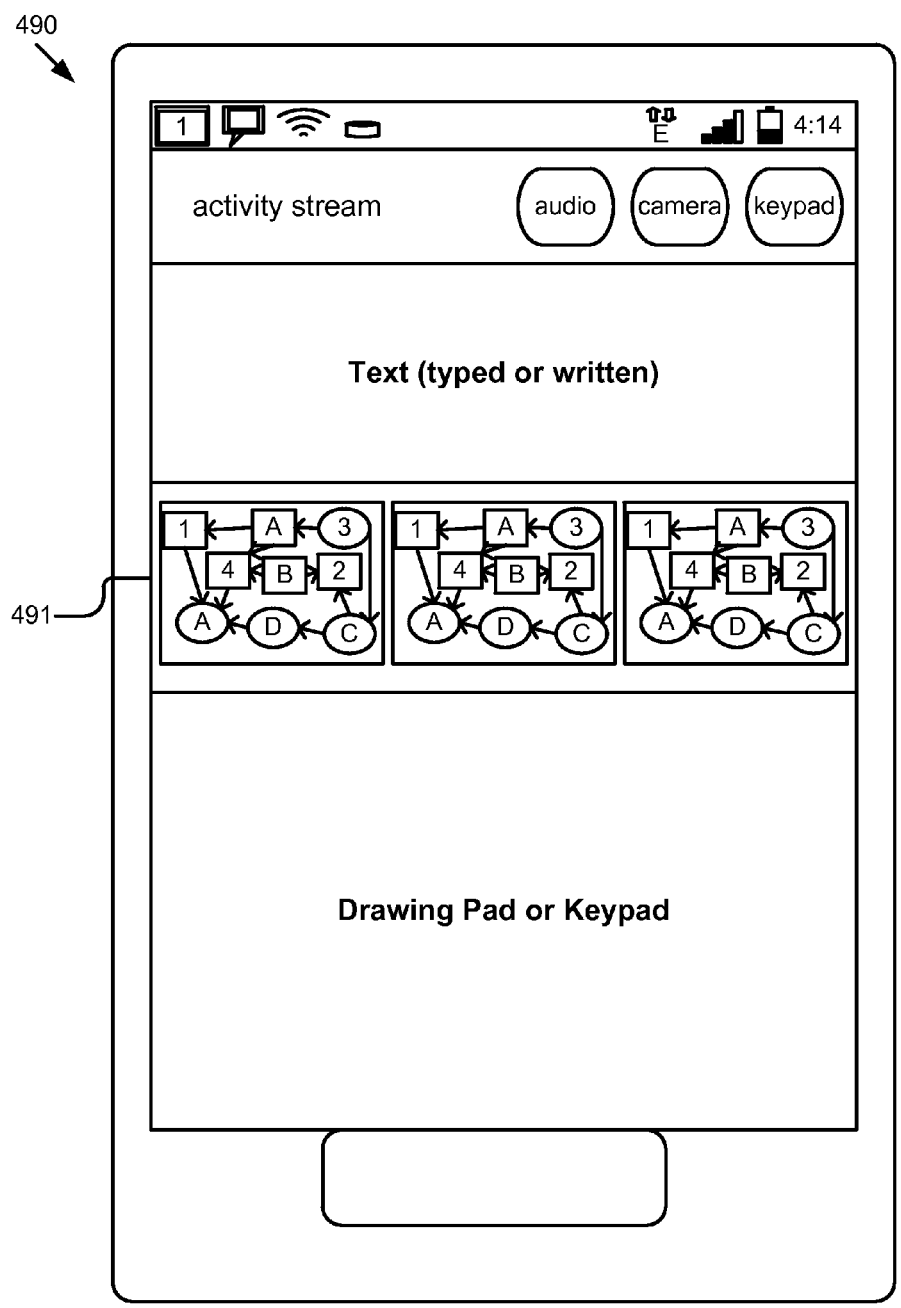
FIG. 4H is one example of a graphic representation of a user interface that is generated by a user interface engine for displaying a text mode with pictures.

Turning now to FIG. 4H, a representation 490 of the text mode with pictures is illustrated. In one embodiment, the user interface displays a series 491 of pictures. In another embodiment, a picture is selected and opens the selected picture in picture mode. In yet another embodiment, the pictures slide to the left or right to reveal more pictures.

Figure 4I:
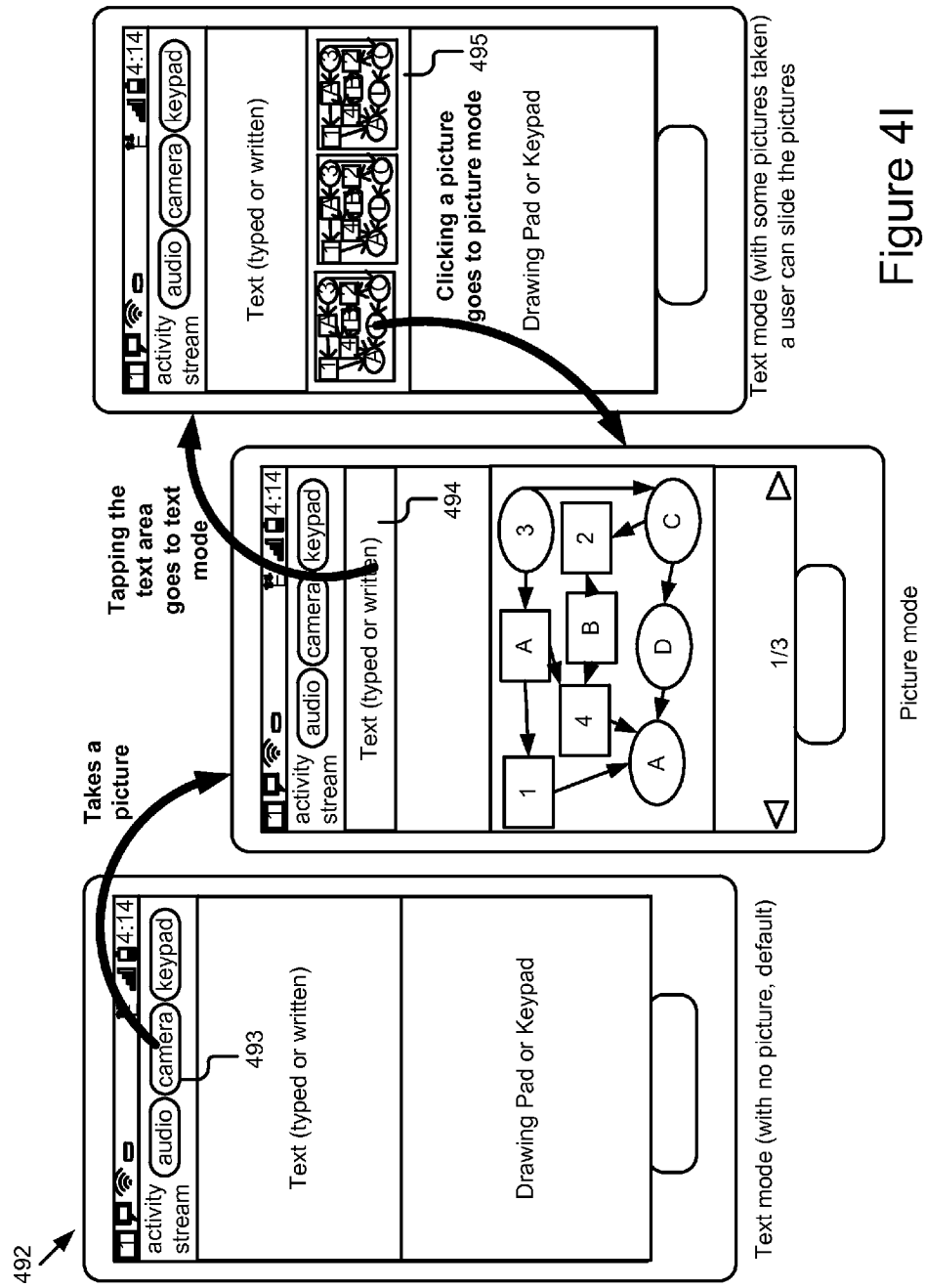
FIG. 4I is one example of a graphic representation of a transition between modes.

Turning now to FIG. 4I, a representation 495 of the transition between modes is illustrated. In one embodiment, a user selects the camera button 496 to activate the camera application stored on the user device 115. The user device 115 receives a picture from the camera, and the user interface engine 211 displays the image in picture mode. Tapping the text area 497 causes the user interface engine 211 to display the text mode for receiving text input from the user. In text mode, the user taps one of the pictures in the list of pictures 498 to return to picture mode.

Figure 4J:
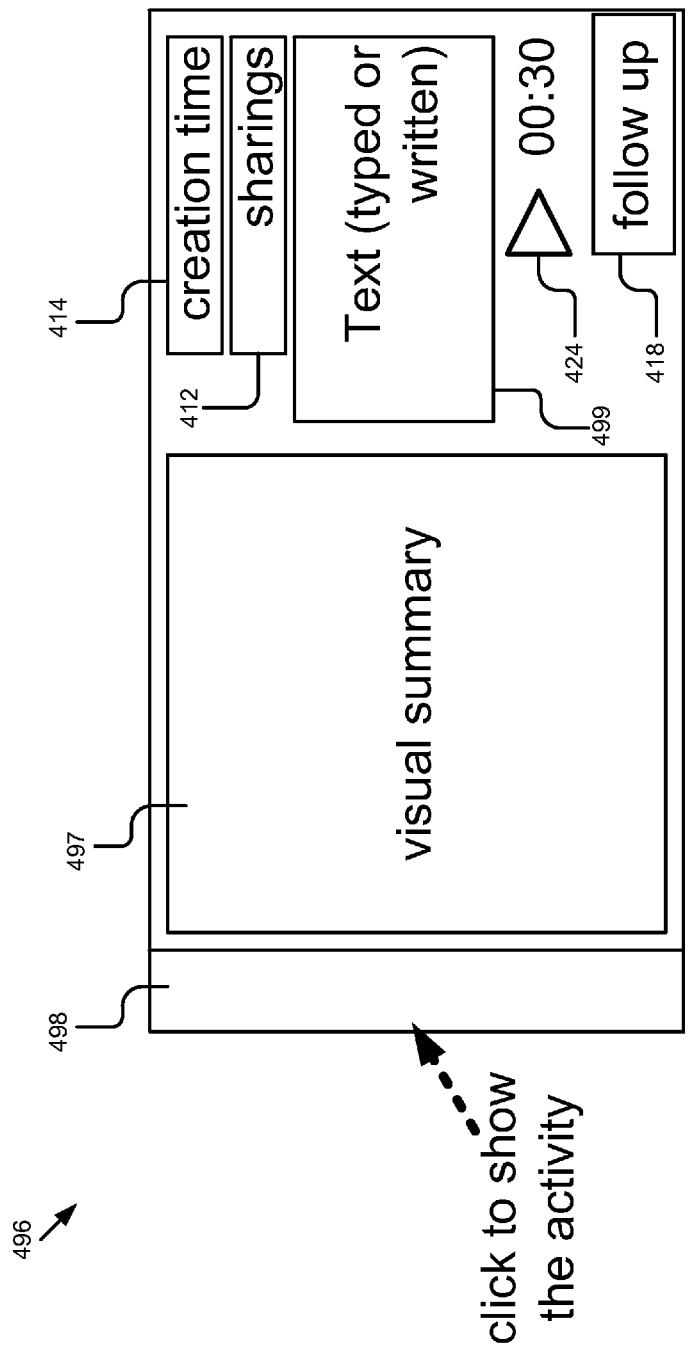
FIG. 4J is one example of a graphic representation of a thumbnail.

Turning now to FIG. 4J, a representation 496 of a thumbnail is illustrated according to one example. In one embodiment, the user interface engine 211 displays a summary of events relating to an activity. The user returns to the activity stream by clicking on the left-hand column 498 of the thumbnail. The visual summary box 497 displays a summary of images. On the right-hand side of the thumbnail, the user interface engine 211 displays a creation time 414 for the event(s), instances of sharings 412 of the event(s), text 499 that is in typed or written form, an audio clip 424 and a follow-up icon 418 for following up on any of the events.

Figure 5:
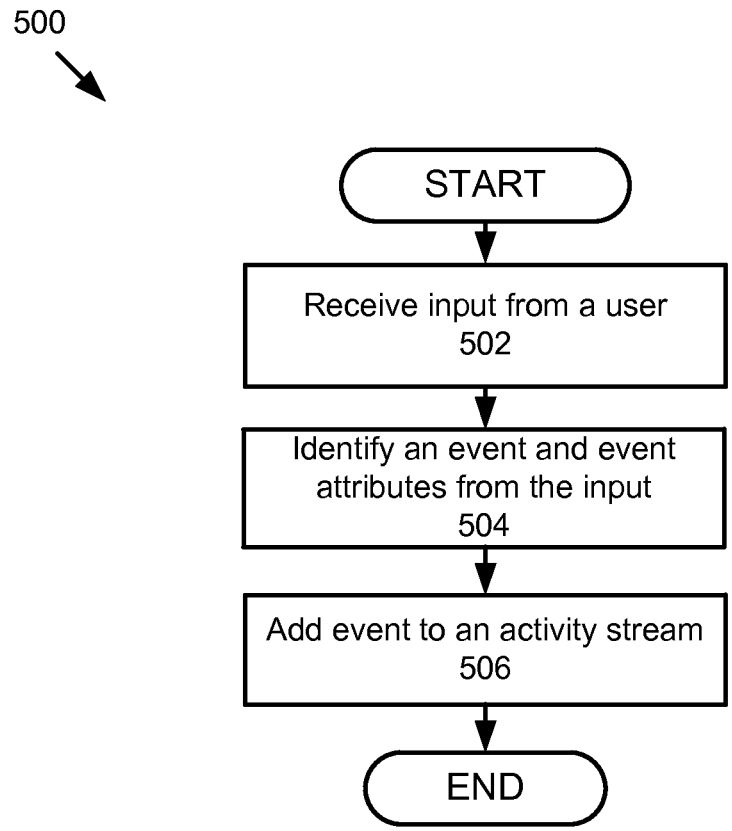
FIG. 5 is a flow diagram of one embodiment of a method for capturing a new event.

Referring now to FIGS. 5-8, various embodiments of the methods for adding an event to the activity streams 217 and searching for unstructured data will be described. FIG. 5 is a flow diagram of one embodiment of a method 500 for adding an event to the activity streams 217. The processing module 201 receives 502 input from a user. The processing module 201 identifies 504 an event and event attributes from the input. For example, the processing module 201 receives an image of a whiteboard with a user inputted task to create a datasheet. The processing module 201 identifies the image as a picture, identifies the latitude and longitude of the user at the time the image was captured, identifies the place where the image was captured, identifies collaborators associated with the event, etc. The processing module 201 transmits the event and event attributes to the activity stream module 205, which adds 506 the event to the activity stream.

Figure 6:
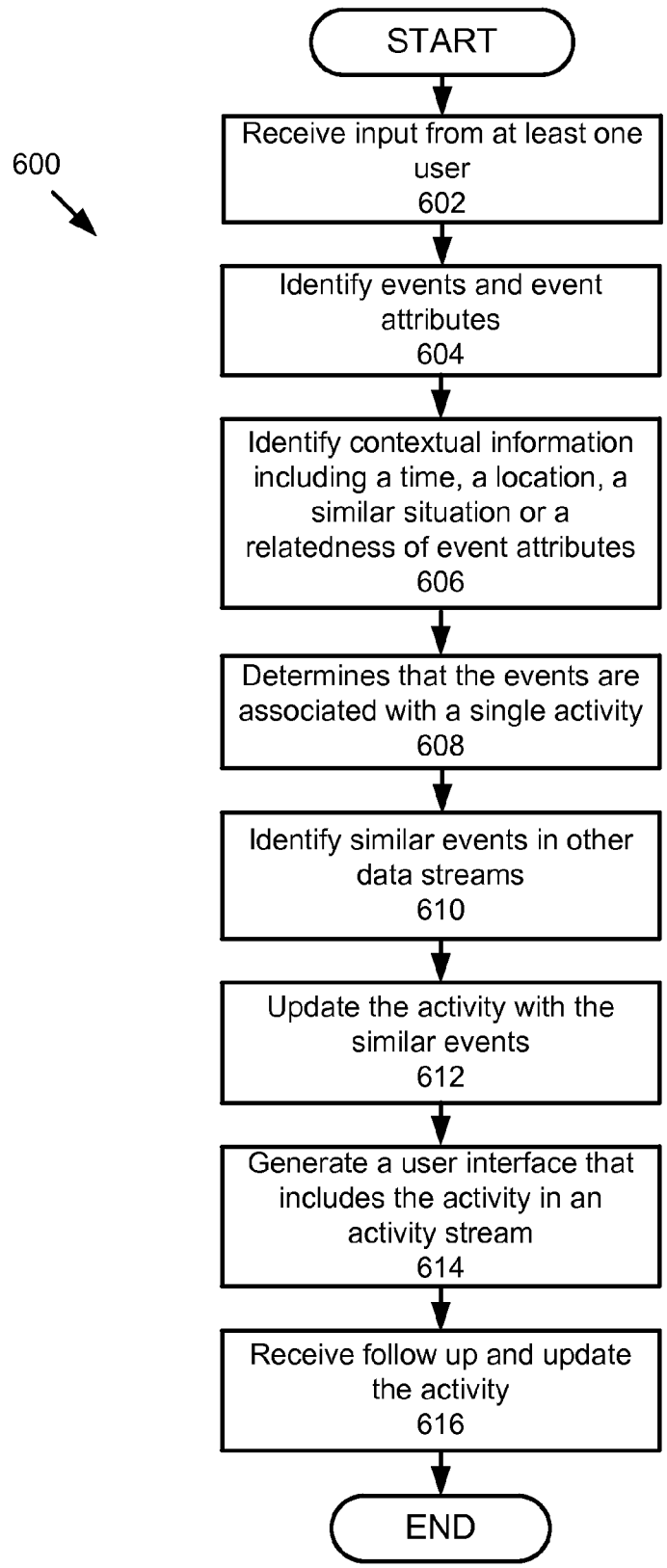
FIG. 6 is a flow diagram of one embodiment of a method for adding events to an activity.

Referring now to FIG. 6, a more detailed embodiment of the method 600 for associating events with the same activity and updating the activity stream 217 is described. The processing module 201 receives 602 input from at least one user and identifies 604 events and event attributes. For example, the processing module 201 identifies a first event and first event attributes for the first event from a first activity stream and the processing module 201 identifies a second event and second event attributes for the second event from a second activity stream. The processing module 201 transmits the events and event attributes to the activity stream module 205.

The activity stream module 205 includes an add module 303, an updating module 305, a identifying module 307 and a query module 309. The add module 303 generates 608 an activity that includes the event. The add module 303 identifies 606 contextual information including a time, a location, a similar situation or a relatedness of event attributes and determines 608 that the events are associated with a single activity and adds the events to the activity.

The identifying module 307 identifies 610 similar events in other data streams. For example, the identifying module 307 and identifies discussions of different tasks in the user's email that the user needs to complete for a project based on keywords that are associated with the event. The identifying module 307 transmits the task to the updating module 305, which updates 612 the activity with the similar events, for example, by adding tasks from the email messages to the activity. In one embodiment, the user confirms that the event should be added before the updating module 305 updates the activity. The updating module 305 also updates the events in other modification settings, including when the user wants to share the event with other users or add a collaborator.

The add module 303 transmits the activity to the user interface engine 211, which generates 614*a* user interface that includes the activity in an activity stream. If the activity stream application 103 is stored on a user device 115, the user interface engine 211 transmits the user interface to a display device for display on the user device 115. If the activity stream application 103 is stored on the server 101, the user interface engine 211 transmits the user interface to a communication unit that transmits the user interface over the network 105 to the user device 115 for display.

The user interface includes a follow-up button. The user interface engine 211 receives 616*a* follow up (i.e. a selection of the follow-up button) from the user and transmits the follow-up to the updating module 305, which updates the activity. For example, the user selects the follow-up button and indicates that the user has completed a task. The updating module 305 updates the activity with the completed task and transmits the updated information to the user interface engine 211 for display.

Figure 7:
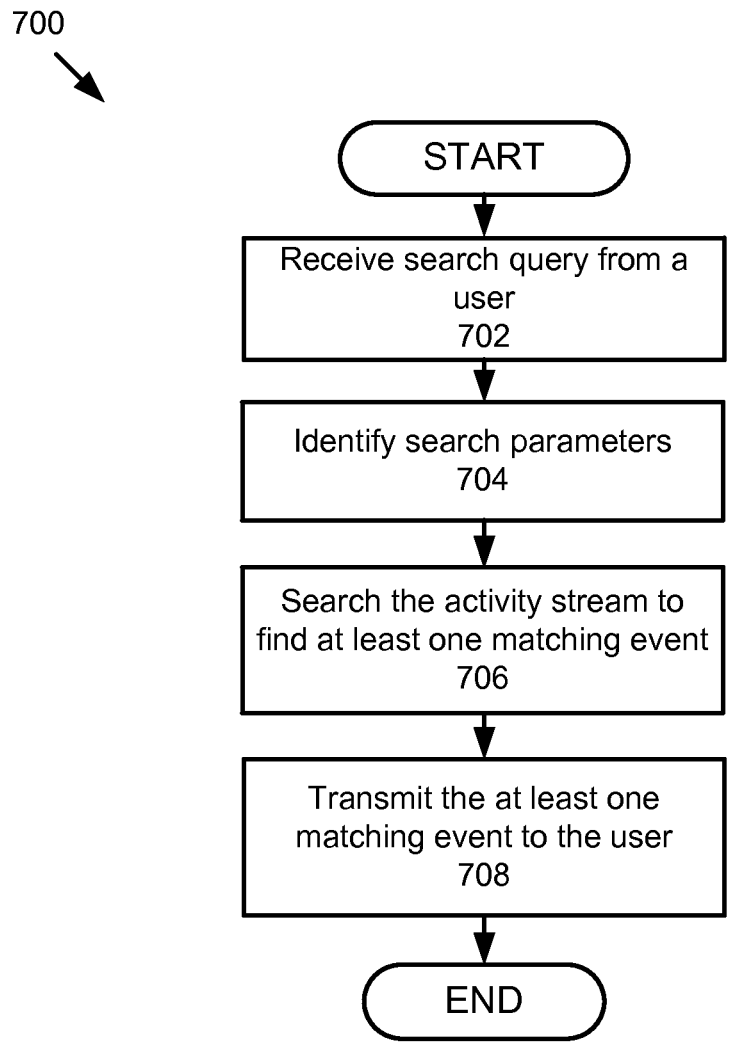
FIG. 7 is a flow diagram of one embodiment of a method for searching for an event or activity.

Referring now to FIG. 7, various embodiments of the method for searching for an event and/or activity will be described. FIG. 7 is a flow diagram of one embodiment of a method 700 for searching for an event and/or activity. The processing module 201 receives 702 a search query from a user. In one embodiment the search request is an HTTP request. The processing module 201 transmits the search request to the activity stream module 205, which identifies 704 search parameters in the request. For example, the search request specifies that the user wants to view all events that involve Justin during a three-month time interval. The activity stream module 205 searches 706 the activity streams 217 to find at least one matching event. The activity stream module 205 transmits the at least one matching event to the user interface engine 211, which transmits 708 the at least one matching event to the user.

Figure 8:
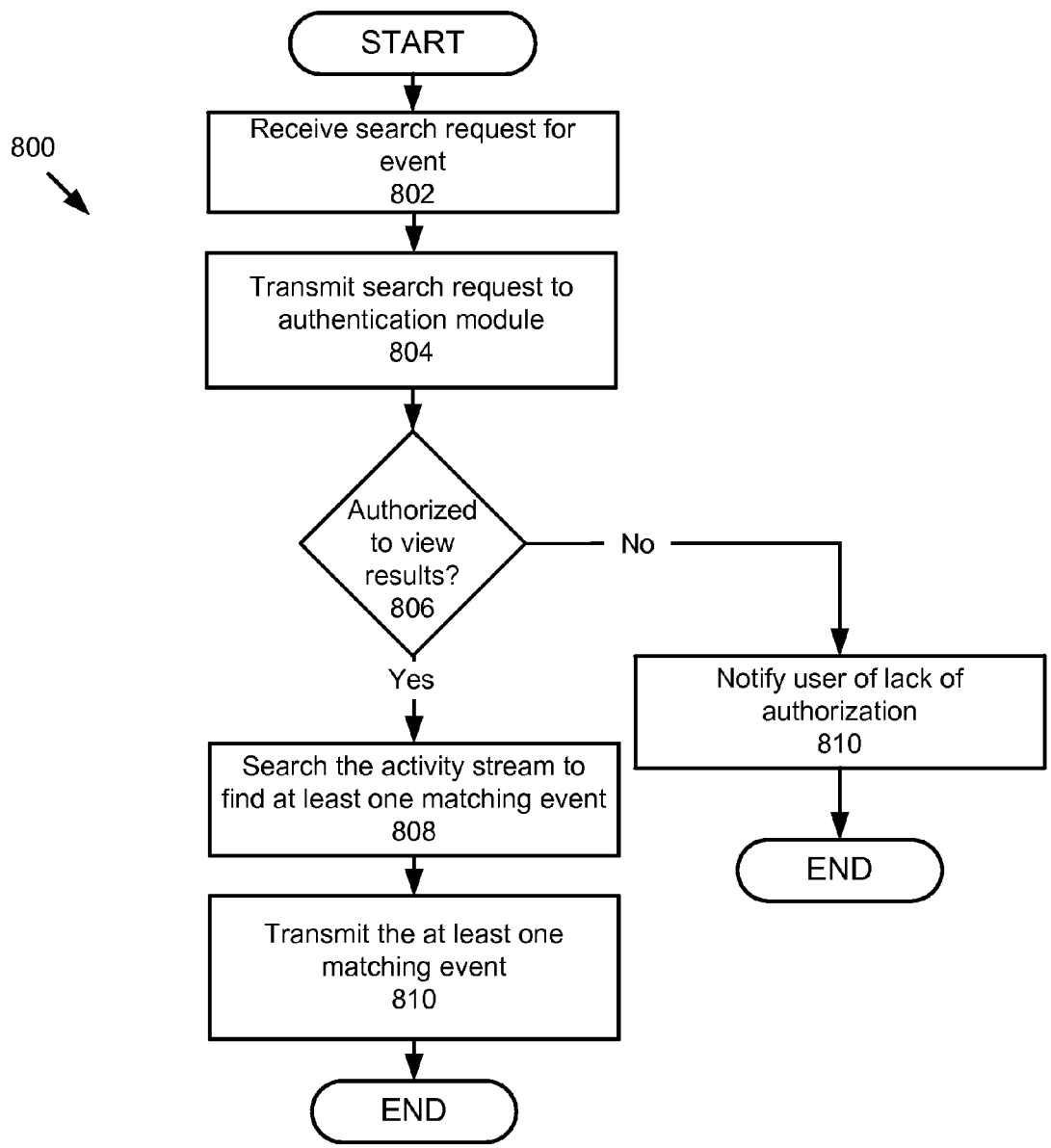
FIG. 8 is a flow diagram of one embodiment of a method for searching for an event or activity.

Referring now to FIG. 8, various embodiments of the method 800 for searching for an event will be described in further detail. The processing module 201 receives 802 a search request for an event that includes context for retrieving events that take place at a similar time, at a similar location, in a similar situation or where the events are related. The processing module 201 transmits 804 the search request to the authentication module 209, which determines 606 whether the user is authorized to view the results. In one embodiment, the authentication module 209 confirms that the user is a valid user of the service. In another embodiment, the authentication module 209 confirms that the user ID matches the collaborator ID for events. In another embodiment, the authentication step occurs after the query module 309 retrieves the matching events and before the matching events are transmitted to the user interface engine 211. If the user is not authorized to view the results, the user interface engine 211 notifies 810 the user of a lack of authorization. If the user is authorized to view the results, the authentication module 209 transmits the search request to the query module 209, which is part of the activity stream module 205.

When the context is at a similar time, the query module 309 retrieves events that happen at a similar time of day or during a similar day of the week as the search term. When the context is at a similar location, the query module 309 retrieves events that occurred at a similar location as the search term. In one embodiment the user specifies a threshold distance, including a location within three miles of the search term. If the context is a similar situation, in one example, the query module 309 relies on calendar information and the result of an activity inference based on other signals including incoming and outgoing calls. If the context is a related context, the query module 309 applies a high-level activity clustering algorithm to return events that are likely contributing to the same activity.

The query module 209 searches 808 the activity stream 217 to find at least one matching event. The query module 209 transmits the at least one matching event to the user interface engine 211, which generates a user interface to include the at least one matching event and transmits 810 the at least one matching event to the user.

In the above description, for purposes of explanation, numerous specific details are set forth in order to provide a thorough understanding of the specification. It will be apparent, however, to one skilled in the art that the technology can be practiced without these specific details. In other instances, structures and devices are shown in block diagram form in order to avoid obscuring the description. For example, the present embodiment is described in one embodiment below primarily with reference to user interfaces and particular hardware. However, the present embodiment applies to any type of computing device that can receive data and commands, and any peripheral devices providing services.

Reference in the specification to "one embodiment" or "an embodiment" means that a particular feature, structure, or characteristic described in connection with the embodiment is included in at least one embodiment of the description. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present embodiment of the specification also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The specification can take the form of an entirely hardware embodiment, an entirely software embodiment or an embodiment containing both hardware and software elements. In a preferred embodiment, the specification is implemented in software, which includes but is not limited to firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the embodiments of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats. Furthermore, as will be apparent to one of ordinary skill in the relevant art, the modules, routines, features, attributes, methodologies and other aspects of the disclosure can be implemented as software, hardware, firmware or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the disclosure is in no way limited to implementation in any specific programming language, or for any specific operating system or environment. Accordingly, the disclosure is intended to be illustrative, but not limiting, of the scope of the specification, which is set forth in the following claims.

What is claimed is:

1. A method comprising:
   receiving an image as a search query, the image being a first event;
   identifying search parameters in the search query that include first event attributes associated with the first event;
   identifying a second event and second event attributes for the second event;
   identifying contextual information associated with a single activity;
   associating the first event and the second event as being associated with the single activity based on the contextual information describing relatedness of the first and second event attributes;
   generating a task associated with completing the single activity for a user; and
   updating the single activity based on a status change of the task.

2. The method of claim 1, wherein the contextual information includes one from the group of a time, a location, a date, and a similar situation.

3. The method of claim 1, wherein identifying first event attributes comprises:
   receiving a longitude and a latitude; and
   associating the longitude and the latitude with first event attributes of the first event.

4. The method of claim 3, further comprising:
   identifying a keyword associated with the first event; and
   associating the keyword with the longitude and the latitude.

5. The method of claim 1, further comprising:
   identifying a first keyword associated with the first event;
   identifying a second keyword associated with the second event; and
   associating the first keyword with the second keyword.

6. The method of claim 1, further comprising:
   identifying a phone call, the phone call having a date and a time; and
   associating first event attributes with the phone call based in part on temporal locality of the date and time of the phone call and first event attributes.

7. The method of claim 1, further comprising generating for display a collapsible user interface that includes the first event and the second event.

8. A computer program product comprising a non-transitory computer usable medium including a computer readable program, wherein the computer readable program when executed on a processor of a computer causes the computer to perform steps comprising:
   receiving an image as a search query, the image being a first event;
   identifying search parameters in the search query that include first event attributes associated with the first event;
   identifying a second event and second event attributes for the second event;
   identifying contextual information associated with a single activity;
   associating the first event and the second event as being associated with the single activity based on contextual information describing relatedness of the first and second event attributes;
   generating a task associated with completing the single activity for a user; and
   updating the single activity based on a status change of the task.

9. The computer program product of claim 8, wherein the contextual information includes one from the group of a time, a location, a date, and a similar situation.

10. The computer program product of claim 8, wherein the computer readable program also causes the computer to perform steps comprising:
    receiving a longitude and a latitude; and
    associating the longitude and the latitude with first event attributes of the first event.

11. The computer program product of claim 10, wherein the computer readable program also causes the computer to perform steps comprising:
    identifying a keyword associated with the first event; and
    associating the keyword with the longitude and the latitude.

12. The computer program product of claim 8, wherein the computer readable program also causes the computer to perform steps comprising:
    identifying a first keyword associated with the first event;
    identifying a second keyword associated with the second event; and
    associating the first keyword with the second keyword.

13. The computer program product of claim 8, wherein the computer readable program also causes the computer to perform steps comprising:
    identifying a phone call, the phone call have a date and a time; and
    associating first event attributes with the phone call based in part on temporal locality of the date and time of the phone call and first event attributes.

14. The computer program product of claim 8, wherein the computer readable program also causes the computer to perform steps comprising generating for display a collapsible user interface that includes the first event and the second event.

15. A system comprising:
    a processor; and
    a memory storing instructions that, when executed, cause the system to:
       receiving an image as a search query, the image being a first event;
       identifying search parameters in the search query that include first event attributes associated with the first event;
       identify a second event and second event attributes for the second event; and
       identify contextual information associated with a single activity;
       associate the first event and the second event as being associated with the single activity based on contextual information describing relatedness of the first and second event attributes;
       generate a task associated with completing the single activity for a user; and
       update the single activity based on a status change of the task.

16. The system of claim 15 wherein the contextual information includes one from the group of a time, a location, a date, and a similar situation.

17. The system of claim 15 wherein the memory also stores instructions that, when executed, cause the system to:
   receive a longitude and a latitude; and
   associate the longitude and the latitude with first event attributes of the first event.

18. The system of claim 17 wherein the memory also stores instructions that, when executed, cause the system to:
   identify a keyword associated with the first event; and
   associate the keyword with the longitude and the latitude.

19. The system of claim 15 wherein the memory also stores instructions that, when executed, cause the system to:
   identify a first keyword associated with the first event;
   identify a second keyword associated with the second event; and
   associate the first keyword with the second keyword.

20. The system of claim 15 wherein the memory also stores instructions that, when executed, cause the system to:
   identify a phone call, the phone call have a date and a time; and
   associate first event attributes with the phone call based in part on temporal locality of the date and time of the phone call and first event attributes.

21. The system of claim 15 wherein the memory also stores instructions that, when executed, cause the system to generating for display a collapsible user interface that includes the first event and the second event.

* * * * *